United States Patent [19]
Kurtz et al.

[11] Patent Number: 5,788,343
[45] Date of Patent: Aug. 4, 1998

[54] RAILWAY BRAKE VALVE ASSEMBLY

[75] Inventors: Ronald C. Kurtz, Greer; Scott N. Griffin, Spartanburg; Daniel Brillant, Greer, all of S.C.

[73] Assignee: Westinghouse Air Brake Company, Wildmering, Pa.

[21] Appl. No.: 642,954

[22] Filed: May 6, 1996

[51] Int. Cl.$^6$ ............................................ B60T 8/36
[52] U.S. Cl. .................. 303/119.2; 137/596.17; 303/33
[58] Field of Search ............ 303/3, 15, 22.6, 303/22.7, 32, 33, 40, 54, 118.1, 119.1, 119.2; 251/129.07, 282; 137/596.17

[56] References Cited

U.S. PATENT DOCUMENTS

| | | | |
|---|---|---|---|
| 2,826,215 | 3/1958 | Wolfslau et al. | 251/129.07 |
| 3,566,920 | 3/1971 | Stewart | 137/625.64 |
| 3,944,287 | 3/1976 | Hagase | 303/22.6 |
| 5,050,642 | 9/1991 | Bright | 251/129.07 |
| 5,429,426 | 7/1995 | Hart | 303/33 |
| 5,454,399 | 10/1995 | Kazakis et al. | 303/118.1 |

FOREIGN PATENT DOCUMENTS

| | | | |
|---|---|---|---|
| 336664 | 4/1959 | France | 137/596.17 |
| 916853 | 3/1982 | U.S.S.R. | 137/596.17 |

OTHER PUBLICATIONS

A publication by Westcode, Inc. entitled, "Westcode: Direct Acting Magnet Valve".
A publication by WABCO, Passenger Transit Division entitled, "N-7-D Magnet Valve," dated Mar. 1989.
A publication by WABCO (Westinghouse Air Brake Division), entitled "N-8-E Magnet Valve Portion," dated Dec. 1984.
A publication by WABCO (Westinghouse Air Brake Company), Passenger Transit Division, entitled "D-1 Decelostat® Unit: Part Number 673271 (with connector); 673270 (without connector)," dated Jan. 1991.
A publication by WABCO (Westinghouse Air Brake Company), Passenger Transit Division, entitled "D-1 Decelostat® Unit: Part No. 0675849," dated Mar. 1994.

*Primary Examiner*—Robert J. Oberleitner
*Assistant Examiner*—Chris Schwartz
*Attorney, Agent, or Firm*—Dority & Manning, P.A.

[57] ABSTRACT

A brake valve assembly suitable for use in a railway air brake system to control flow of air between the on-board reservoir and a respective brake cylinder. The valve assembly may include a plurality of internal valves to permit three states of fluid transfer, i.e., delivery, exhaust and lap. The internal valves are controlled by respective solenoids that act directly on the valve element. Internal forces due to fluid pressure are balanced using counterbalance assemblies preferably including a flexible, rolling diaphragm disposed adjacent to a configured follower member. The counterbalance assemblies maintain substantial balance throughout the reciprocative stroke of the valve element.

22 Claims, 5 Drawing Sheets

RAILWAY BRAKE VALVE ASSEMBLY

BACKGROUND OF THE INVENTION

The present invention relates generally to fluid-actuated braking systems, such as the type frequently installed on railway vehicles. More particularly, the invention relates to an improved valve assembly which may be used in such a braking system.

Although its basic concepts were developed many years ago, the air brake system remains in widespread use, particularly in the railway industry. As implied by the name, air brake systems utilize pressurized air to actuate the respective brakes of a vehicle, for example, a railway vehicle. This air is typically supplied by a reservoir located on-board the vehicle, which is "charged" to a desired fluid pressure.

Flow of air between the reservoir and the brake is controlled by a relatively large fluid valve. The valve itself is generally constructed having two or more internal valves to permit multiple states of fluid transfer. Typically, these internal valves are individually controlled by electric solenoids.

Due to operating voltage limitations, the brake solenoids often produce a relatively small operating force. This is in contrast with the relatively large force often imposed on the internal valve mechanism due to fluid pressure. In fact, the fluid force may often exceed the solenoid force by greater than ten (10) times.

In the past, the disparity between the fluid force and the solenoid force has often been addressed utilizing a pilot valve design. Instead of acting directly on the valve, the solenoid in this design functions to control a smaller valve that regulates the pilot supply. Air from the pilot supply in turn actuates a piston connected to the larger valve mechanism. Movement of the piston thus causes the larger valve mechanism to move into and out of engagement with its associated valve seat.

While the pilot valve design is effective to overcome the disparity between the fluid force and the solenoid force, it has several disadvantages. In particular, this construction requires an additional air supply, i.e., the pilot supply, that is otherwise unnecessary for brake operation. Various parts are also required in the valve itself to regulate operation of the additional air supply.

Furthermore, the valve mechanism does not move immediately upon actuation of the solenoid. Instead, the larger valve is actuated only when the pilot supply imposes a sufficient force on the piston. This sequential operation limits the response time of the larger valve.

Various attempts have been made to provide suitable direct-acting valves by reducing the fluid imbalance in the valve, thus cancelling the effects of the fluid force. In some such designs, seals are utilized to balance the fluid pressure in the valve. These seals, however, have often caused a relatively large amount of friction that the solenoid, as well as any return spring, must overcome as the valve mechanism is moved.

Other direct-acting valves have utilized diaphragms in an attempt to balance the fluid forces. Due to the configuration of the diaphragms, however, these valves may still exhibit undesirable force imbalance in certain situations.

SUMMARY OF THE INVENTION

The present invention recognizes and addresses the foregoing disadvantages, and others, of prior art constructions and methods. Accordingly, it is an object of the present invention to provide an improved fluid valve.

It is a specific object of the present invention to provide an improved brake valve assembly particularly useful in railway applications.

It is another object of the present invention to provide an improved brake valve assembly that eliminates the need for a pilot supply.

It is another object of the present invention to provide an improved brake valve assembly that achieves relatively quick response time.

It is another object of the present invention to provide an improved brake valve assembly that substantially achieves balance throughout its operation.

Some of these objects are achieved by an improved brake valve assembly suitable in many embodiments for use on a railway vehicle. The valve assembly includes a valve housing defining a supply port, a delivery port, an exhaust port and an interconnecting conduit. The interconnecting conduit provides fluid communication between first and second valve devices within the valve housing. The valve devices are controllable by respective electric solenoids to effect multiple states of fluid communication between the supply port, the delivery port and the exhaust port.

The multiple states of fluid communication preferably include a fluid delivery state wherein a first fluid flow path is defined between the supply port and the delivery port. A fluid exhaust state is also preferably provided wherein a second fluid flow path is defined between the delivery port and the exhaust port. A lap state may be provided to block fluid communication between the supply port, the delivery port and the exhaust port.

Each of the internal valve devices includes a valve element that directly moves into and out of engagement with an associated valve seat upon actuation of the respective solenoid. To balance internal fluid forces, each of the valve devices further includes at least one counterbalance assembly. In an exemplary embodiment, the first valve device may be equipped with a single counterbalance assembly, with the second valve device having a pair of oppositely-directed counterbalance assemblies.

Each of the counterbalance assemblies is operatively connected in fluid opposition to the valve element when engaging the valve seat. Thus, the counterbalance assembly will provide a fluid force opposite to that imposed on the engaged valve element. Advantageously, the effective area of a respective counterbalance assembly will also preferably remain substantially equal to that of the associated valve seat throughout the predetermined axial range through which the valve element moves.

In exemplary embodiments, each counterbalance assembly comprises a flexible, rolling diaphragm disposed adjacent to a diaphragm follower. The diaphragm follower may be constructed having a cylindrical cup portion integrally extending into a flanged rim portion distal from the valve seat.

In multiple-state embodiments, the first valve device may include a pair of valve seats respectively associated with the supply port and the exhaust port. A single valve element may be provided in such embodiments to reciprocatively move between the pair of valve seats. The second valve device may include a single valve seat, associated with the delivery port.

Other objects of the invention are achieved by a valve assembly for selectively regulating flow of a fluid medium. The valve assembly includes a valve housing defining a first fluid port, a second fluid port and a first fluid flow path therebetween. A solenoid device, including an axially moveable armature element, is also provided for connection to a source of electrical energy. A valve stem is operatively connected to the armature element of the solenoid device for direct axial movement therewith.

The valve assembly further includes a first valve seat located along the first fluid flow path. A valve element is mounted on the valve stem for movement into and out of engagement with the first valve seat. At least one counterbalance assembly, having an effective area substantially equivalent to a predetermined effective area of the first valve seat, is also provided. The counterbalance assembly is configured such that its effective area is substantially constant throughout the axial range over which the valve seat operatively moves.

In some exemplary embodiments, the valve assembly further comprise a spring operatively connected to the valve stem. The spring functions to urge the valve stem in an axial direction opposite to that produced by actuation of the solenoid. An annular guide element may also be mounted to the valve stem to prevent transverse instability during use.

The valve housing may also be configured further defining a third fluid port. In such embodiments, a second valve seat may be located along a second fluid flow path between the third fluid port and the second fluid port. The second valve seat is preferably situated in axial opposition to the first valve seat such that the valve element moves reciprocatively therebetween.

Other objects, features and aspects of the present invention are provided by various combinations and subcombinations of the disclosed elements, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the discussion herein is a description of exemplary embodiments only, and is not intended as limiting the broader aspects of the present invention, which broader aspects are embodied in the exemplary constructions. For instance, for clarity and ease of explanation, the invention will be described as it relates to a railway vehicle. It will be appreciated, however, that the invention is not limited to only railway system applications.

Figure 1:
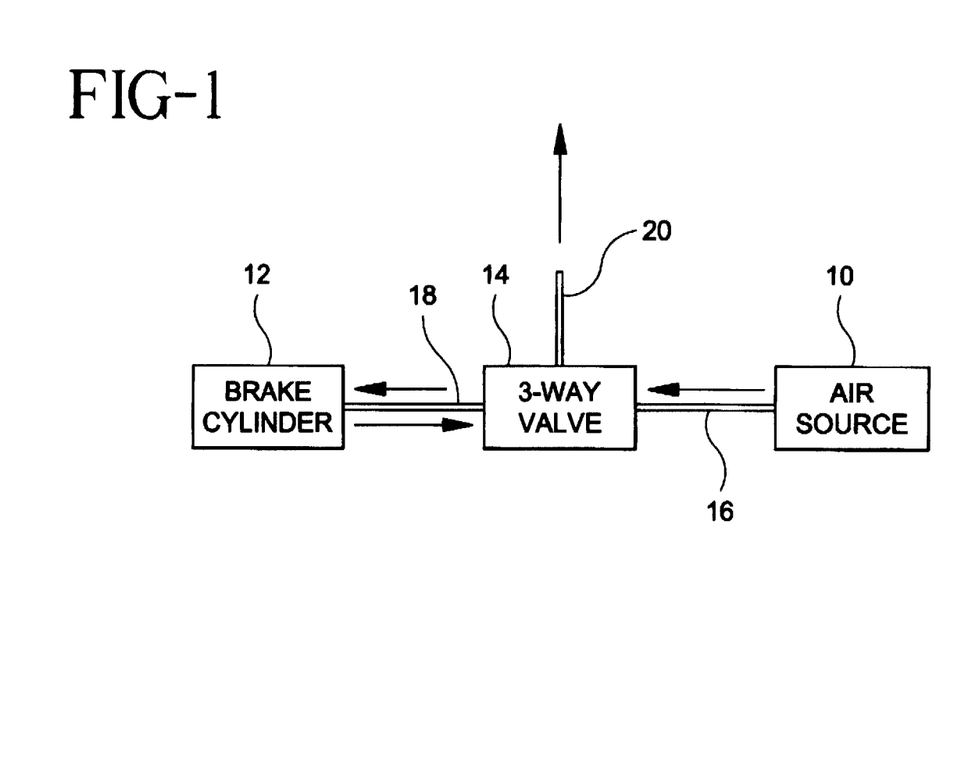
FIG. 1 is a diagrammatic representation illustrating the basic components of a fluid-actuated braking system such as may be installed on a railway vehicle.

FIG. 1 illustrates the major functional components of a typical air brake system often used in railway applications, as commonly understood by those skilled in the art. The system includes an air reservoir 10 in which a supply of compressed air is stored for use as needed. One or more brake cylinders, such as brake cylinder 12, are also provided, each connected to a respective vehicle brake. Each of the brake cylinders functions to apply the respective brake when supplied with pressurized air. Conversely, the brake will be released when air is exhausted from the associated brake cylinder.

A brake valve 14 is provided to control flow of air in the brake system. Fluid communication between reservoir 10 and valve 14 is provided by a suitable conduit 16. Similarly, fluid communication between valve 14 and brake cylinder 12 is provided by a conduit 18. An exhaust pipe, indicated at 20, is also connected to valve 14.

As with many prior art valves, brake valve 14 permits operation in three states: (1) delivery; (2) exhaust; and (3) lap. In the delivery state, air is supplied from reservoir 10, through valve 14, to brake cylinder 12. As a result, the braking force will steadily increase until its maximum level is achieved. In the exhaust state, the vehicle brake is quickly released by exhausting the pressurized air within brake cylinder 12 into the ambient atmosphere through exhaust pipe 20. In the lap state, valve 14 contains the pressurized air already present within brake cylinder 12. As a result, the brake will be neither released nor further applied, but maintained at its current level.

A preferred construction of brake valve 14 may be described with reference to FIG. 2. As can be seen, valve 14 includes a housing block 22 defining various fluid ports. A bottom plate 24 is connected to housing block 22 to facilitate assembly of the internal valve components. A cover 26 may also be provided to enclose the upper portion of valve 14 during use.

Valve 14 includes two internal valves, controlled by respective solenoids 28 and 30. For purposes of explanation, the two internal valves will be referred to as the "left valve" and the "right valve" as seen in the view of FIG. 2. In this case, the left valve includes a valve element 32 axially movable into and out of engagement with valve seat 34. The right valve includes a valve element 36 axially movable into and out of engagement with opposed valve seats 38 and 40. For reasons that will become apparent from the discussion below, valve seats 38 and 40 preferably have approximately the same diameter, and therefore equivalent effective areas.

Referring again also to FIG. 1, housing 14 defines a supply port 42. In use, supply port 42 is connected to conduit 16, thereby establishing fluid communication with reservoir 10. A delivery port 44 is similarly connected to conduit 18 for providing fluid communication with brake cylinder 12. An exhaust port 46 is likewise connected to exhaust pipe 20. Fluid communication between the left and right valves is provided by an interconnecting conduit 48, which may thus itself be considered a port for the respective internal valves.

It will be appreciated that housing 22 defines two fluid flow paths through its interior. The first such flow path extends from supply port 42, along interconnecting conduit 48, to delivery port 44. The second such flow path extends from delivery port 441 back along interconnecting conduit 48, to exhaust port 46. The combination of these flow paths and the configuration of the left and right valves permits the multiple states of fluid transfer described above.

Figure 2:
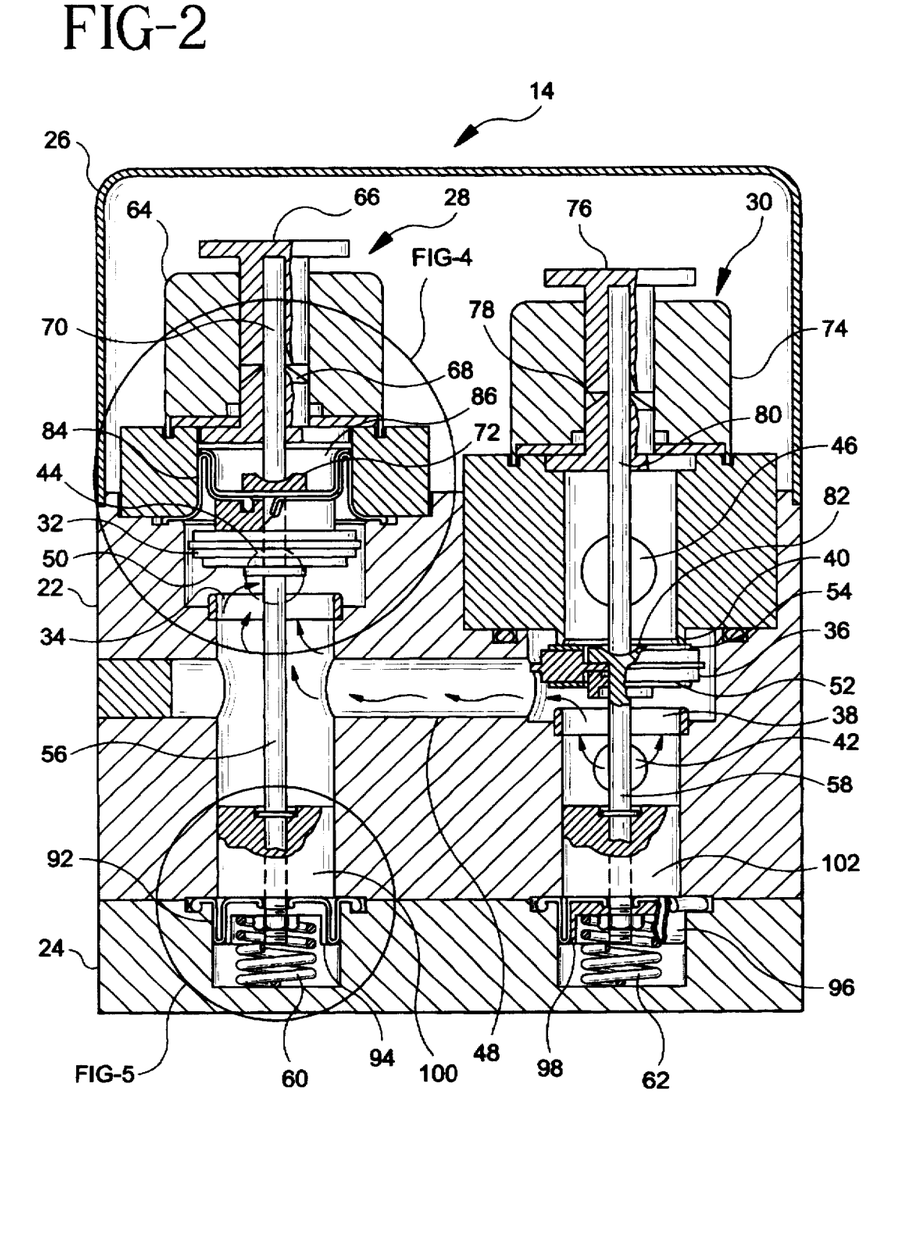
FIG. 2 is a partial cross-sectional view of an improved brake valve assembly constructed in accordance with the present invention.

For example, the delivery state is achieved with valve elements 32 and 36 in their respective "at rest" positions, as shown in FIG. 2. Pressurized air entering supply port 42 will be conducted along the first fluid flow path directly to delivery port 44. The illustrated design thus causes brake application in the absence of an actuation signal at solenoids 28 and 30, as desired in many applications.

The exhaust state is achieved in the illustrated design by the actuation of solenoid 30. Specifically, actuation of solenoid 30 causes valve element 36 to engage valve seat 38. In so doing, valve element 36 moves from its "at rest" engagement with valve seat 40. As a result, pressurized air within the brake cylinder will be conducted along the second fluid flow path from delivery port 44 to exhaust port 46.

The lap state is achieved by actuation of solenoid 28. Specifically, actuation of solenoid 28 will cause valve element 32 to move from its "at rest" position into engagement with valve seat 34. When valve element 32 is engaged in this manner, pressurized air already present in the brake cylinder will be trapped. As such, the braking force applied by the associated brake will remain substantially constant.

Figure 3:
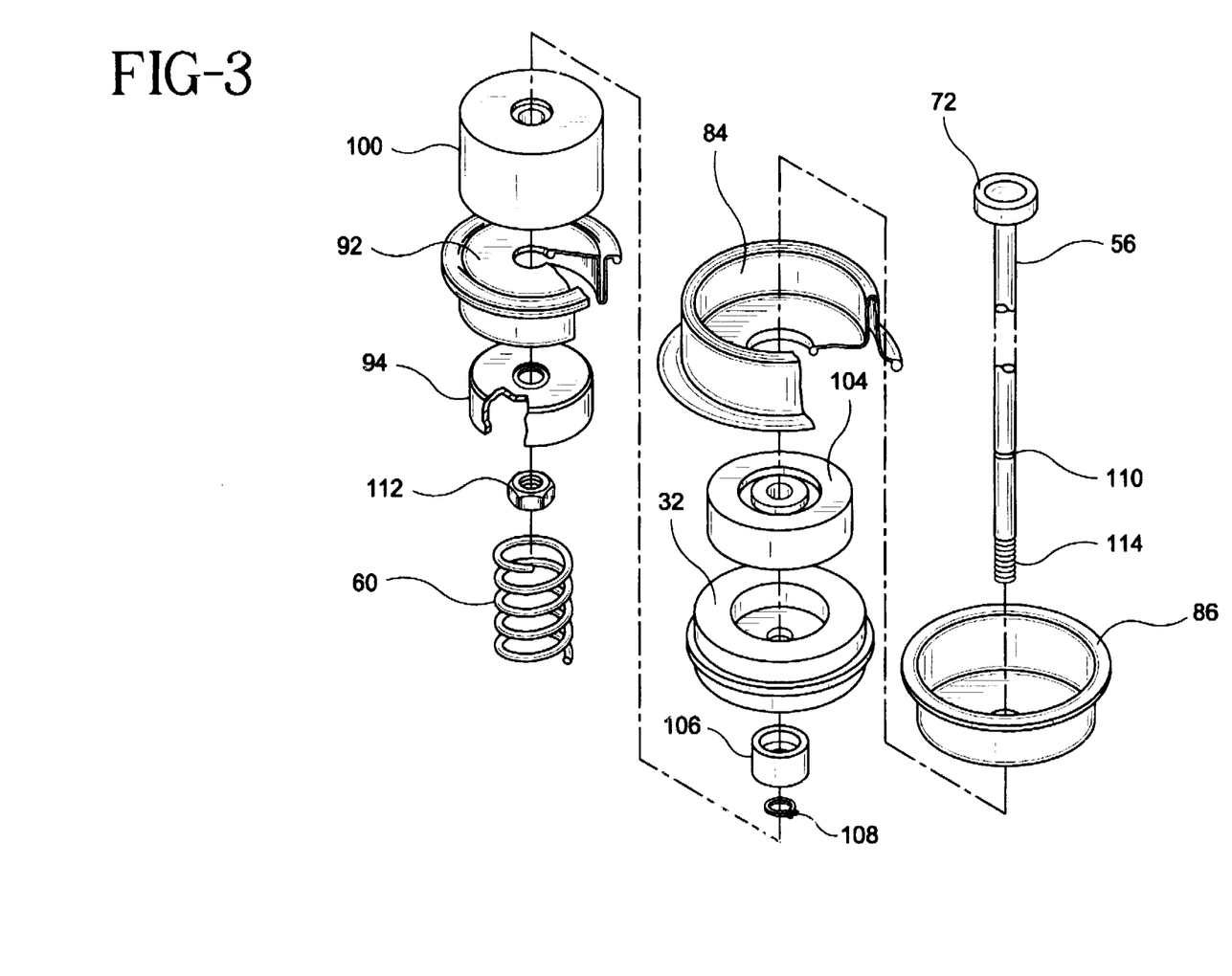
FIG. 3 is an exploded view of the valve stem and associated components shown in the left valve of FIG. 2.
Figure 4:
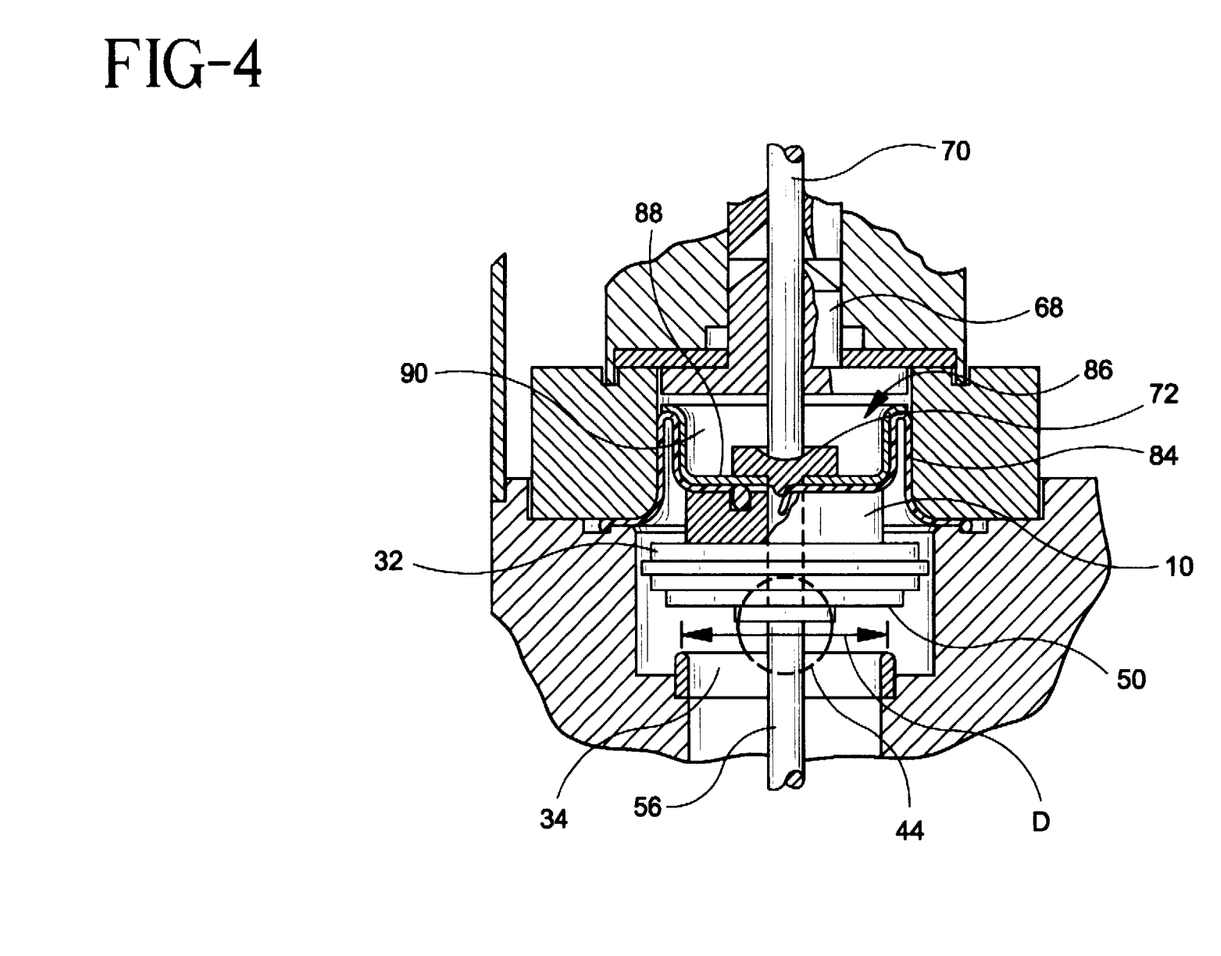
FIG. 4 is an enlarged partial cross-sectional view of the area so indicated in FIG. 2.
Figure 5:
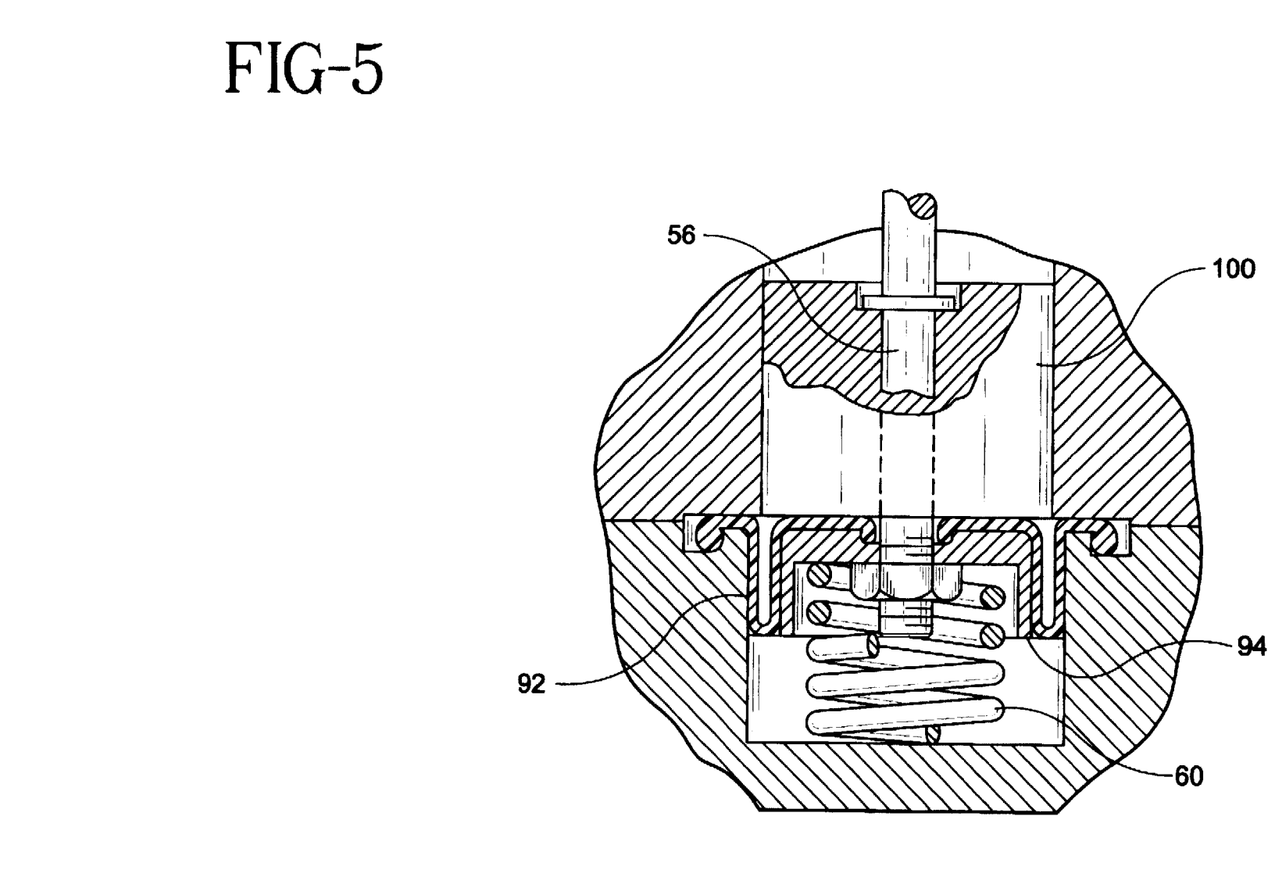
FIG. 5 is an enlarged partial cross-sectional view of the area so indicated in FIG. 2.

Referring now also to FIGS. 3 through 5, the construction of the internal valves will be described in detail. Each of the valve elements 32 and 36 are configured in this case as a disc having an elastomeric ring mounted thereon for engaging the associated valve seat and providing an effective seal therewith. Thus, valve element 32 has a single elastomeric ring 50 mounted on its bottom side for engaging valve seat 34. Similarly, valve element 36 has two elastomeric rings 52 and 54 mounted on its respective sides for engaging valve seats 38 and 40.

As can be seen, valve elements 32 and 36 are themselves mounted on respective valve stems 56 and 58. Solenoids 28 and 30 function to move valve stems 56 and 58 axially downward (in the reference frame of FIG. 2), whereas springs 60 and 62 urge valve stems 56 and 58 axially upward. In the illustrated embodiment, springs 60 and 62 are chosen such that they provide sufficient spring force to return respective valve elements 32 and 40 to their "at rest" positions when solenoids 28 and 30 are deactivated. Spring 62 should also provide sufficient spring force to ensure an effective seal between elastomeric ring 54 and valve seat 40.

Solenoid 28 includes a stationary coil portion 64, a moveable armature 66 and a stationary pole piece 68. A push pin 70, extending through pole piece 68, is attached to armature 66. As shown, push pin 70 engages a stem head 72 located at one end of valve stem 56. As a result, an electrical current applied to coil portion 64 will cause attraction of armature 66 to pole piece 68, thereby causing push pin 70 to axially move valve stem 56.

Similarly, solenoid 30 includes a stationary coil portion 74, a moveable armature 76 and a stationary pole piece 78. A push pin 80 is provided in this case to engage a stem head 82 located at one end of valve stem 58.

As discussed above, fluid pressure within valve 14 will often greatly exceed the axial force that can be easily produced by a typical solenoid or return spring. In an unbalanced valve design, a significant portion of this fluid force will oppose axial movement of the valve stem. For example, the fluid force may act on the valve element in a direction opposite that which occurs when the solenoid is activated, or opposite the direction of the return spring. The solenoid or spring may be, unless made very large, incapable of producing sufficient axial force to overcome this fluid force.

To cancel the effects of the fluid force, the left and right internal valves of valve 14 each include at least one counterbalance assembly. Preferably, a counterbalance assembly will be provided for each valve inlet supplying greater than atmospheric pressure at some time during its operation. Thus, the left valve will have two (2) counterbalance assemblies, since pressurized air from both the supply port 42 (through interconnecting conduit 48) and delivery port 44 must be balanced. The right valve, on the other hand, may have a single counterbalance assembly to balance pressurized air from the supply port 42. Exhaust port 46 may not require a counterbalance assembly if it exhausts to atmosphere.

In presently preferred embodiments, the counterbalance assemblies function to provide a substantially constant balancing force throughout the reciprocative stroke of the associated valve element. In other words, the counterbalance assembly will provide a certain balancing force not only at the end points of the stroke, i.e., completely closed or completely open, but at axial locations in between. As a result, valve 14 is more easily controlled with less solenoid or spring force than would otherwise be required.

Toward this end, each of the counterbalance assemblies is preferably constructed having a flexible, rolling diaphragm supported by a complementary diaphragm follower. A thin diaphragm is especially preferred because it contributes relatively little friction that the solenoid and spring must overcome. A diaphragm having a thickness of no greater than approximately 20–30 mils is generally useful for this purpose.

As shown in FIG. 4, the counterbalance assembly located adjacent stem head 72 includes diaphragm 84 and diaphragm follower 86. Follower 86 is configured having a cup-shaped lower portion 88 integrally extending into an a upper flanged rim portion 90. It can be seen that diaphragm 84 largely conforms to the exterior dimensions of follower 86.

During use, diaphragm 84 will maintain a substantially constant effective area as follower 86 is moved axially with valve stem 56. (The effective area of the diaphragm may be defined as the diameter at the location where it folds back onto itself, in this case directly under rim portion 90 of follower 86.) In order to substantially balance the fluid force imposed on valve element 32 when engaging valve seat 34, this effective area is preferably made to be substantially equal to the effective area of valve seat 34 (which may be determined from its effective diameter D).

Because the effective area of diaphragm 84 will remain substantially constant as it is moved axially with valve stem 56 (due to follower 90), the axial force imposed on diaphragm 84 by the fluid will also remain substantially constant (except to the extent that the fluid pressure itself may vary). In this way, diaphragm 84 will contribute a controlled, upward balancing force during the reciprocative stroke of valve stem 56. This is in contrast to many prior art valve designs in which the effective area of the diaphragm may vary as the valve stem moves. This change in effective area may cause a concomitant change in the force component contributed by the diaphragm. It will be appreciated that such a varying force may lead to undesirable operational states in the valve.

The other counterbalance assemblies of valve 14 function in a similar manner. In this regard, FIG. 5 illustrates the lower counterbalance assembly of the left valve, which includes a diaphragm 92 and a follower 94. Due to the configuration of follower 94, the effective area of diaphragm 92 will remain substantially constant during the stroke of valve stem 56. As a result, a controlled, downward balancing force will be contributed as valve element 32 axially moves with valve stem 56. Like the upper counterbalance assembly, the effective area of the lower counterbalance assembly is also preferably made to be approximately equal to that of valve seat 34.

As shown in FIG. 2, the single counterbalance assembly of the right valve similarly includes diaphragm 96 and follower 98. Follower 98 ensures that the effective area of diaphragm 96 will remain substantially constant as valve stem 58 is moved. Thus, this counterbalance assembly will also provide a controlled balancing force throughout the reciprocative stroke of valve element 36. In this case, the effective area is preferably made to be approximately equivalent to that of valve seat 38 (and valve seat 40).

The operation of the left and right valves, as aided by the various counterbalance assemblies, will now be described. With valve element 32 and valve element 36 in their respective "at rest" positions, pressurized air will flow from supply port 42 to delivery port 44, as described above. This fluid force will impose a certain axial force on diaphragm 84 in the upward axial direction. However, an equivalent fluid force will also be imposed on diaphragm 92 in the opposite, downward axial direction. As such, diaphragm 84 and diaphragm 92 will function to counterbalance one another, as desired.

The pressurized air from supply port 42 will also impose a downward axial force on diaphragm 96. In addition, an upward axial force will be imposed on valve element 36, as defined by the effective area of valve seat 40. Because the effective area of diaphragm 96 and valve seat 40 are the same, however, the fluid forces will be substantially canceled.

Assume now that valve 14 is to enter the lap state. In this case, valve element 32 will move from its "at rest" position into engagement with valve seat 34, as described above. Because the effective areas of diaphragm 84 and diaphragm 92 remain the same during axial movement of valve stem 56, the fluid forces which would otherwise oppose axial movement of valve stem 56 also remain substantially balanced. This balance will continue throughout substantially the entire stroke through which valve element 32 axially moves.

As valve element 32 engages valve seat 34, a fluid force will be imposed thereon in proportion to a pressure difference between supply port 42 and delivery port 44, as well as the effective area of valve seat 34. Because diaphragm 84 has the same effective area as valve seat 34, diaphragm 84 will oppose the fluid force imposed on valve element 32 by pressurized fluid entering back through delivery port 44. Similarly, diaphragm 92 will balance the force imposed on valve element 32 by fluid entering through supply port 42.

Assume now that valve 14 has entered the exhaust state. In this case, valve element 32 will be in its "at rest" position, where diagrams 84 and 92 will balance each other as described above. In addition, however, valve element 36 will move from its "at rest" position against valve seat 40 into engagement with valve seat 38. As a result, pressurized fluid entering supply port 42 will impose equal and opposite forces on diaphragm 96 and the underside of valve element 36. Again, the fluid force will be substantially balanced, as desired.

Referring again to FIG. 2, the illustrated construction further includes a cylindrical guide element 100 mounted to valve stem 56. As shown, guide element 100 has an outer diameter slightly smaller than the inner diameter of the interior bore through which valve stem 56 extends. As a result, guide element 100 functions to transversely stabilize valve stem 56 during its axial movements. A similar guide element 102 is mounted to valve stem 58. As one skilled in the art will recognize, sufficient clearance is provided around valve elements 32 and 36, and guide elements 100 and 102, to allow fluid to act on the respective counterbalance assemblies.

For purposes of further describing the construction of valve 14, reference is now made to FIG. 3. Specifically, FIG. 3 illustrates the manner in which the various components may be assembled onto valve stem 56 in the illustrated embodiment. While only valve stem 56 is shown in this drawing, it should be appreciated that valve stem 58 may be similarly assembled.

As shown, the first component mounted on valve stem 56 is follower 86. Next, diaphragm 84 is mounted on valve stem 56, followed by a backing disc 104. Valve element 32 and retaining collar 106 are next installed.

Guide element 100 is retained in position by a snap ring 108. Snap ring 108 is itself maintained in a groove 110 defined about valve stem 58 at the appropriate location. After guide element 100 is installed, diaphragm 92 and follower 94 are positioned on valve stem 56. Finally, a retaining nut 112 is secured to a threaded portion 114 at the end of valve stem 56.

It can be seen that the present invention provides a valve assembly which overcomes the various disadvantages of the prior art. Because of the substantial balancing achieved in the valve interior, the axial forces supplied by both the solenoid and the return spring can be very small. In fact, the force of the return spring may be limited to the small amount of diaphragm friction, as well as the force component necessary to achieve firm engagement between the valve element and its associated valve seat. The solenoid should be sized to produce these force components plus sufficient force to overcome the return spring.

It should also be distinctly understood that the teachings of the present invention are not limited to valves having multiple interior valves, but also include various singular valve designs. Thus, while preferred embodiments of the invention have been shown and described, modifications and variations thereto may be practiced by those of ordinary skill in the art without departing from the spirit and scope of the present invention, which is more particularly set forth in the appended claims. In addition, various embodiments of the invention may be interchanged both in whole or in part. Furthermore, those of ordinary skill in the art will appreciate that the foregoing description is by way of example only, and is not intended to be limitative of the invention so further described in such appended claims.

What is claimed is:

1. A brake valve assembly comprising:

a valve housing defining a supply port, a delivery port, an exhaust port and an interconnecting conduit;

first and second valve devices having respective solenoids for control thereof, said valve devices being in fluid communication with one another along said interconnecting conduit and having respective valve elements axially movable into and out of engagement with associated valve seats;

said valve devices further arranged such that control thereof by selective actuation of said respective solenoids will effect multiple states of fluid communication between said supply port, said delivery port and said exhaust port;

each of said valve devices being constructed such that said respective valve element thereof is directly axially movable upon actuation of said respective solenoid; and each of said valve devices further comprising at least one counterbalance assembly including a flexible, rolling diaphragm disposed adjacent to a diaphragm follower and operatively connected to be in fluid opposition to said respective valve element when engaging said associated valve seat to counterbalance a fluid force imposed thereon through one of said ports.

2. A brake valve assembly as set forth in claim 1, wherein said multiple states of fluid communication include:

a fluid delivery state wherein a first fluid flow path is defined between said supply port and said delivery port;

a fluid exhaust state wherein a second fluid flow path is defined between said delivery port and said exhaust port; and a lap state wherein fluid communication into and out of said delivery port is blocked.

3. A brake valve assembly as set forth in claim 2, wherein said first valve device includes a pair of valve seats respectively associated with said supply port and said exhaust port.

4. A brake valve assembly as set forth in claim 3, wherein said respective valve element of said first valve device comprises a single valve element reciprocatively movable between said pair of valve seats.

5. A brake valve assembly as set forth in claim 3, wherein said second valve device includes a single valve seat associated with said delivery port.

6. A brake valve assembly as in claim 1, wherein each said at least one counterbalance assembly has an effective area substantially equal to an effective area defined by said associated valve seat, said effective area of said counterbalance assembly remaining substantially constant throughout a predetermined axial range through which said respective valve element operatively moves.

7. A brake valve assembly as set forth in claim 1, wherein said diaphragm follower has a cylindrical cup portion integrally extending into a flanged rim portion distal from said valve seat.

8. A brake valve assembly as set forth in claim 1, wherein said at least one counterbalance assembly of said first valve device consists of a single counterbalance assembly and said at least one counterbalance assembly of said second valve device consists of a pair of oppositely-directed counterbalance assemblies.

9. A brake valve assembly as set forth in claim 1, wherein said flexible, rolling diaphragm has a thickness of no greater than approximately 30 mils.

10. A brake valve assembly comprising:

a valve housing defining a supply port, a delivery port, an exhaust port and an interconnecting conduit;

first and second valve devices having respective solenoids for control thereof, said valve devices being in fluid communication with one another along said interconnecting conduit and having respective valve elements axially movable into and out of engagement with associated valve seats, said first valve device including a pair of valve seats respectively associated with said supply port and said exhaust port, said second valve device including a single valve seat associated with said delivery port;

said valve devices further arranged such that control thereof by selective actuation of said respective solenoids will effect multiple states of fluid communication between said supply port, said delivery port and said exhaust port, said multiple states of fluid communication including:

i. a fluid delivery state wherein a first fluid flow path is defined between said supply port and said delivery port;

ii. a fluid exhaust state wherein a second fluid flow path is defined between said delivery port and said exhaust port; and iii. a lap state wherein fluid communication into and out of said delivery port is blocked;

each of said valve devices being constructed such that said respective valve element thereof is directly axially movable upon actuation of said respective solenoid; and each of said valve devices further comprising at least one counterbalance assembly operatively connected to be in fluid opposition to said respective valve element when engaging said associated valve seat to counterbalance a fluid force imposed thereon through one of said ports, wherein said at least one counterbalance assembly of said first valve device comprises a single counterbalance assembly and said at least one counterbalance assembly of said second valve device comprises a pair of oppositely-directed counterbalance assemblies.

11. A brake valve assembly as set forth in claim 10, wherein said counterbalance assemblies each comprise a flexible, rolling diaphragm disposed adjacent to a diaphragm follower.

12. A valve assembly for selectively regulating flow of a fluid medium, said valve assembly comprising:

a valve housing defining a first fluid port, a second fluid port and a first fluid flow path therebetween;

a solenoid device connectable to a source of electrical energy, said solenoid device including an axially movable armature element;

a valve stem operatively connected to said armature element of said solenoid device for direct axial movement therewith in at least a first axial direction over a predetermined axial range;

a first valve seat located along said first fluid flow path, said first valve seat defining a predetermined effective area;

a valve element mounted on said valve stem for movement into and out of engagement with said first valve seat; and at least one counterbalance assembly including a flexible diaphragm disposed adjacent to a diaphragm follower and operatively connected to said valve stem to be in fluid opposition to said valve element when engaging said valve seat, said counterbalance assembly having an effective area substantially equivalent to said predetermined effective area of said first valve seat throughout said predetermined axial range.

13. A valve assembly as set forth in claim 12, wherein said flexible diaphragm is a rolling diaphragm.

14. A valve assembly as set forth in claim 13, wherein said diaphragm follower has a cylindrical cup portion integrally extending into a flanged rim portion distal from said valve seat.

15. A valve assembly as set forth in claim 12, further comprising a spring operatively connected to said valve stem to bias said valve stem in a second axial direction opposite to said first axial direction.

16. A valve assembly as set forth in claim 15, wherein said valve element is operative to engage said first valve seat when moved in said first axial direction and disengage said first valve seat when moved in said second axial direction.

17. A valve assembly as set forth in claim 12, wherein said at least one counterbalance assembly consists of respective first and second counterbalance assemblies operatively connected to said valve stem on opposite sides of said valve element.

18. A valve assembly as set forth in claim 17, wherein said first and second counterbalance assemblies each comprise a flexible diaphragm disposed adjacent to a diaphragm follower.

19. A valve assembly as set forth in claim 12, further comprising:
   said valve housing further defining a third fluid port;
   a second valve seat located along a second fluid flow path between said third fluid port and said second fluid port; and
   said second valve seat situated in axial opposition to said first valve seat such that said valve element moves reciprocatively therebetween, said predetermined axial range being defined by an axial distance between said first valve seat and said second valve seat.

20. A valve assembly as set forth in claim 12, further comprising an annular guide element mounted to said valve stem.

21. A valve assembly as set forth in claim 12, wherein said flexible, rolling diaphragm has a thickness of no greater than approximately 30 mils.

22. A brake valve assembly comprising:
   a valve housing defining a supply port, a delivery port, an exhaust port and an interconnecting conduit;
   first and second valve devices having respective solenoids for control thereof, said valve devices being in fluid communication with one another along said interconnecting conduit and having respective valve elements axially movable into and out of engagement with associated valve seats;
   said valve devices further arranged such that control thereof by selective actuation of said respective solenoids will effect multiple states of fluid communication between said supply port, said delivery port and said exhaust port;
   each of said valve devices being constructed such that said respective valve element thereof is directly axially movable upon actuation of said respective solenoid; and
   each of said valve devices further comprising at least one counterbalance assembly operatively connected to be in fluid opposition to said respective valve element when engaging said associated valve seat to counterbalance a fluid force imposed thereon through one of said ports, wherein said at least one counterbalance assembly of said first valve device consists of a single counterbalance assembly and said at least one counterbalance assembly of said second valve device consists of a pair of oppositely-directed counterbalance assemblies.

* * * * *